United States Patent
Glafkides

(10) Patent No.: US 11,604,995 B2
(45) Date of Patent: Mar. 14, 2023

(54) MODIFICATION OF NEURAL NETWORK TOPOLOGY

(71) Applicant: DATAVALORIS S.A.S., Fontenay-sous-Bois (FR)

(72) Inventor: Jean-Patrice Glafkides, Fontenay-sous-Bois (FR)

(*) Notice: Subject to any disclaimer, the term of this patent is extended or adjusted under 35 U.S.C. 154(b) by 579 days.

(21) Appl. No.: 16/704,828

(22) Filed: Dec. 5, 2019

(65) Prior Publication Data

US 2020/0184334 A1  Jun. 11, 2020

Related U.S. Application Data

(60) Provisional application No. 62/775,752, filed on Dec. 5, 2018.

(51) Int. Cl.
 *G06N 3/08* (2006.01)
 *G06N 3/04* (2006.01)
 *G06N 3/082* (2023.01)

(52) U.S. Cl.
 CPC ............ *G06N 3/082* (2013.01); *G06N 3/04* (2013.01)

(58) Field of Classification Search
 CPC .............................. G06N 3/082; G06N 3/04
 See application file for complete search history.

(56) References Cited

U.S. PATENT DOCUMENTS

| | | | |
|---|---|---|---|
| 11,335,048 B1* | 5/2022 | Lee | G06F 3/04842 |
| 2007/0094168 A1 | 4/2007 | Ayala et al. | |
| 2017/0132817 A1 | 5/2017 | Mahkajan et al. | |
| 2017/0213131 A1* | 7/2017 | Hammond | H04L 67/01 |
| 2019/0251707 A1* | 8/2019 | Gupta | G06T 9/002 |

OTHER PUBLICATIONS

PCT International Search Report and Written Opinion issued in corresponding application No. PCT/IB2019/060492, dated Apr. 6, 2020.

* cited by examiner

*Primary Examiner* — Angelica Ruiz
(74) *Attorney, Agent, or Firm* — Maschoff Brennan

(57) ABSTRACT

A method may include obtaining data representative of an NNT of a graph-based model that includes multiple components. The multiple components may include multiple neural nodes and at least one connection. The at least one connection may associate two or more of the neural nodes. The method may include displaying the NNT including the multiple components in a GUI via a display screen. The method may include receiving user input effective to indicate that at least one of the components of the NNT is to be modified. The user input may be received via the GUI. The method may include modifying the at least one of the components of the NNT. The at least one of the components may be modified based on the user input. The method may include displaying the NNT that comprises the modification of the at least one of the components via the GUI.

17 Claims, 8 Drawing Sheets

MODIFICATION OF NEURAL NETWORK TOPOLOGY

CROSS-REFERENCE TO RELATED APPLICATION

This patent application claims the benefit of and priority to U.S. Provisional App. No. 62/775,752 filed Dec. 5, 2018 titled "MODIFICATION OF NEURAL NETWORK TOPOLOGY," which is incorporated in the present disclosure by reference in its entirety.

FIELD

The application relates generally to modification of a neural network topology.

BACKGROUND

Unless otherwise indicated in the present disclosure, the materials described in the present disclosure are not prior art to the claims in the present application and are not admitted to be prior art by inclusion in this section.

Deep-learning networks such as a neural network may be trained to provide solutions to problems. The neural network may include a topology of blocks, neural nodes, and connections that control the learning of the neural network. The neural network may learn through various types of machine learning methods such as supervised, semi-supervised, or unsupervised learning methods. Such methods may be called neuro-evolution, which may be one approach for learning in a neural network.

The subject matter claimed herein is not limited to embodiments that solve any disadvantages or that operate only in environments such as those described above. Rather, this background is only provided to illustrate one example technology area where some embodiments described herein may be practiced.

SUMMARY

One or more embodiments of the present disclosure may include a method. The method may include obtaining data representative of a neural network topology (NNT). The data may be representative of the NNT of a graph-based model. The NNT may include multiple components. The multiple components may include multiple neural nodes and at least one connection. The at least one connection may associate two or more of the neural nodes. The method may also include displaying the NNT including the multiple components. The NNT may be displayed in a graphical user interface (GUI) via a display screen. In addition, the method may include receiving user input effective to indicate that at least one of the components of the NNT is to be modified. The user input may be received via the GUI. Further, the method may include modifying the at least one of the components of the NNT. The at least one of the components may be modified based on the user input. The method may include displaying the NNT that comprises the modification of the at least one of the components. The NNT that comprises the modification of the at least one of the components may be displayed via the GUI.

One or more embodiments of the present disclosure may include a system. The system may include one or more processors configured to perform or control performance of operations. The operations may include obtaining data representative of an NNT. The data may be representative of the NNT of a graph-based model. The NNT may include multiple components. The multiple components may include multiple neural nodes and at least one connection. The at least one connection may associate two or more of the neural nodes. The operations may also include displaying the NNT including the multiple components. The NNT may be displayed in a GUI via a display screen. In addition, the operations may include receiving user input effective to indicate that at least one of the components of the NNT is to be modified. The user input may be received via the GUI. Further, the operations may include displaying the NNT that comprises the modification of the at least one of the components and the updated machine learning results. The NNT that comprises the modification of the at least one of the components may be displayed via the GUI.

One or more embodiments of the present disclosure may include a non-transitory computer-readable storage medium. The non-transitory computer-readable storage medium may include computer-executable instructions stored thereon that are executable by a processor device to perform or control performance of operations. The operations may include obtaining data representative of an NNT. The data may be representative of the NNT of a graph-based model. The NNT may include multiple components. The multiple components may include multiple neural nodes and at least one connection. The at least one connection may associate two or more of the neural nodes. The operations may also include displaying the NNT including the multiple components. The NNT may be displayed in a GUI via a display screen. In addition, the operations may include receiving user input effective to indicate that at least one of the components of the NNT is to be modified. The user input may be received via the GUI. Further, the operations may include displaying the NNT that comprises the modification of the at least one of the components and the updated machine learning results. The NNT that comprises the modification of the at least one of the components may be displayed via the GUI.

The object and advantages of the embodiments will be realized and achieved at least by the elements, features, and combinations particularly pointed out in the claims. Both the foregoing general description and the following detailed description are exemplary and explanatory and are not restrictive.

BRIEF DESCRIPTION OF THE DRAWINGS

Example embodiments will be described and explained with additional specificity and detail through the use of the accompanying drawings in which.

DETAILED DESCRIPTION

Figure 1:
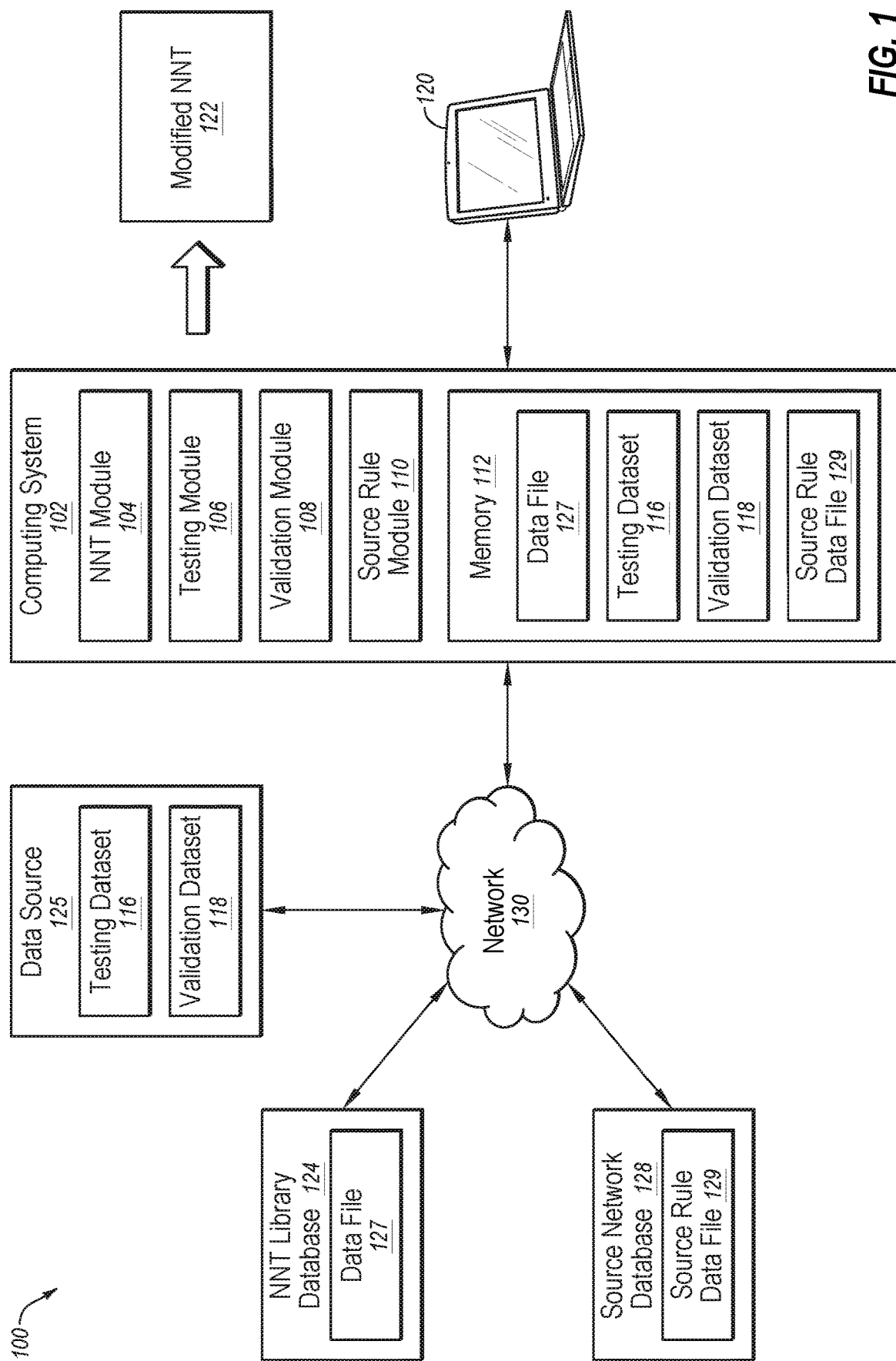
FIG. 1 illustrates an example operating environment in which techniques for modification of the NNT may be implemented.

A neural network may be configured as a deep-learning network that generates machine learning results based on training (e.g., experience). The neural network may include a neural network topology (NNT) that includes components that control the machine learning of the neural network. The components may include layers, neural nodes, neural network inputs, neural network outputs, neural network weights, and connections. In some embodiments, the NNT may include a similar layout as a human brain that includes numerous neurons that are connected by numerous connections. The neural network may be directed to a particular achievement, directed to a particular objective, or solve a particular problem for different technical fields. Example technical fields may include computer vision, speech recognition, natural language processing, audio recognition, social network filtering, machine translation, bioinformatics, drug design, agro-food, business activity, human resources, insurance, automobile industry, education, health care, or public relations.

In some embodiments, the neural network may include a deep neural network, a deep belief network, a recurrent neural network, or any other appropriate graph-based model network. Example graph-based model networks may include a genetic programming model, a tree-based model, a forest-based machine learning model, and/or a block graph model. The neural network may learn according to machine learning methods. In some embodiments, the machine learning methods may include a supervised method, a semi-supervised method, or an unsupervised method.

In some embodiments, the machine learning performed by the neural network may be called neuro-evolution. Neuro-evolution may permit the neural network to operate without a known solution (e.g., example results) for a particular problem. Neuro-evolution may consume significant computational power of an associated computing system. In addition, neuro-evolution may include the use of a particular NNT.

Some NNTs may be inefficient for neuro-evolution use due to the NNTs including large and/or complex topologies. Inefficient NNTs may increase the computational power consumed during operation, decrease performance of operation (e.g., speed performance), or include unnecessary/forced parameters that limit compatibility or functionality of the neural network (e.g., for installation on embedded devices).

Some neural network technologies, such as those found in convolution neural networks (CNN), back-propagation neural networks (BPNN), and Kohonen networks, may result in or provide a generic NNT that is not specifically directed to the particular problem. Also, some neural network technologies may not permit customization or optimization of the NNT. For example, some neural network technologies may display the NNT in an unmodifiable format. As another example, some neural network technologies may not permit user input to be received to indicate components of the NNT are to be modified.

Accordingly, some embodiments described in the present disclosure may include a system and a method to customize the NNT of a graph-based model of a neural network. In some embodiments, the NNT may be customized based on user input. In these and other embodiments, the computing system may obtain data representative of the NNT of the graph-based model. The NNT may include the components such as neural nodes and connections associating the neural nodes. The NNT including the components may be displayed in the GUI via a display screen of the computing system.

In some embodiments, the NNT may be displayed as a three-dimensional representation of the NNT. In other embodiments, the NNT may be displayed as a two-dimensional representation of the NNT. User input may be received via the GUI effective to indicate that one or more components of the NNT are to be modified. For example, the user input may indicate that a component of the NNT is to be removed or altered. As another example, the user input may indicate that a component is to be added to the NNT.

The computing system may modify the selected component based on the user input (e.g., the computing system may generate a modified NNT). For example, if a component is to be removed from the NNT, the computing system may delete data corresponding to the component from the data representative of the NNT. As another example, if a component is to be added to the NNT, the computing system may add data corresponding to the new component to the data representative of the NNT.

The computing system may display the modified NNT via the GUI. In some embodiments, modifications made to the NNT may be verified prior to performing machine learning. In these and other embodiments, the modified NNT may be tested and configuration or other issues within the modified NNT may be diagnosed and corrected prior to performing machine learning.

In at least one embodiment described in the present disclosure, the NNT may be customized to reduce computational overhead of the computing system. In addition, the NNT may be customized to direct the neural network to a particular problem that the neural network was not previously directed to. In some embodiments, the user may act as a brain surgeon of the NNT and digitally alter a human brain like layout of the NNT to create the modified NNT. According to at least one embodiment described in the present disclosure, the modified NNT may be more efficient and optimized than the NNT that is not customized or optimized.

These and other embodiments of the present disclosure will be explained with reference to the accompanying figures. It is to be understood that the figures are diagrammatic and schematic representations of such example embodiments, and are not limiting, nor are they necessarily drawn to scale. In the figures, features with like numbers indicate like structure and function unless described otherwise.

FIG. 1 illustrates an example operating environment 100 in which techniques for modification of the NNT may be implemented, arranged in accordance with at least one embodiment described in the present disclosure. The operating environment 100 may include a computing system 102, which may be configured to perform the NNT modification. The operating environment 100 may also include a display screen 120, a network 130, an NNT library database 124, a data source 125, and a source network database 128. In some embodiments, the display screen 120 may include a screen that is capable of displaying NNTs and other images as two-dimensional representations and/or three-dimensional representations. In some embodiments, the NNT library database 124, the data source 125, and the source network database 128 may include cloud storage environments and/or marketplace environments, Marketplace environments may include environment in which NNTs may be bought, shared, traded, etc. In these and other embodiments, the computing system 102 may include a framework generating engine (e.g., an NNT module 104, a testing module 106, a validation module 108, and/or a source rule module 110) authorized to access or network with the NNT library database 124, the data source 125, and/or the source network database 128.

The network 130 may include any communication network configured for communication of signals between any of the components (e.g., 102, 124, 125, and 128) of the operating environment 100. The network 130 may be wired or wireless. The network 130 may have numerous configurations including a star configuration, a token ring configuration, or another suitable configuration. Furthermore, the network 130 may include a local area network (LAN), a wide area network (WAN) (e.g., the Internet), and/or other interconnected data paths across which multiple devices may communicate. In some embodiments, the network 130 may include a peer-to-peer network. The network 130 may also be coupled to or include portions of a telecommunications network that may enable communication of data in a variety of different communication protocols.

In some embodiments, the network 130 includes or is configured to include a BLUETOOTH® communication network, a Z-Wave® communication network, an Insteon® communication network, an EnOcean® communication network, a Wi-Fi communication network, a ZigBee communication network, a HomePlug communication network, a Power-line Communication (PLC) communication network, a message queue telemetry transport (MQTT) communication network, a MQTT-sensor (MQTT-S) communication network, a constrained application protocol (CoAP) communication network, a representative state transfer application protocol interface (REST API) communication network, an extensible messaging and presence protocol (XMPP) communication network, a cellular communication network, any similar communication networks, or any combination thereof for sending and receiving data. The data communicated in the network 130 may include data communicated via short messaging service (SMS), multimedia messaging service (MMS), hypertext transfer protocol (HTTP), direct data connection, wireless application protocol (WAP), e-mail, smart energy profile (SEP), ECHONET Lite, OpenADR, or any other protocol that may be implemented with the computing system 102, the NNT library database 124, the data source 125, and the source network database 128.

The NNT library database 124, the data source 125, and the source network database 128 may include one or more collections of information. In some embodiments, the NNT library database 124 may include a data file 127. In these and other embodiments, the source network database 128 may include a source rules data file 129. In some embodiments, the NNT library database 124 and the source network database 128 may be associated with or otherwise maintained by an entity associated with the graph model. For example, the entity associated with the graph model may include Google®, Facebook® or IBM's Watson®. Additionally or alternatively, the data source 125 may include a testing dataset 116 and a validation dataset 118. The computing system 102 may include the NNT module 104, the testing module 106, the validation module 108, and the source rule module 110. In addition, the computing system 102 may include a memory 112. The memory 112 may be the same or similar to the memory 656 of FIG. 6.

The NNT module 104 may include code and routines configured to enable the computing system 102 to perform one or more operations with respect to generating a modified NNT 122. Additionally or alternatively, the NNT module 104 may be implemented using hardware including a processor, a microprocessor (e.g., to perform or control performance of one or more operations), a field-programmable gate array (FPGA), or an application-specific integrated circuit (ASIC). In some other instances, the NNT module 104 may be implemented using a combination of hardware and software. In the present disclosure, operations described as being performed by the NNT module 104 may include operations that the NNT module 104 may direct a corresponding system (e.g., the computing system 102) to perform.

The testing module 106 may include code and routines configured to enable the computing system 102 to perform one or more operations with respect to training the modified NNT 122. Additionally or alternatively, the testing module 106 may be implemented using hardware including a processor, a microprocessor (e.g., to perform or control performance of one or more operations), a field-programmable gate array (FPGA), or an application-specific integrated circuit (ASIC). In some other instances, the testing module 106 may be implemented using a combination of hardware and software. In the present disclosure, operations described as being performed by the testing module 106 may include operations that the testing module 106 may direct a corresponding system (e.g., the computing system 102) to perform.

The validation module 108 may include code and routines configured to enable the computing system 102 to perform one or more operations with respect to validating the modified NNT 122. Additionally or alternatively, the validation module 108 may be implemented using hardware including a processor, a microprocessor (e.g., to perform or control performance of one or more operations), a field-programmable gate array (FPGA), or an application-specific integrated circuit (ASIC). In some other instances, the validation module 108 may be implemented using a combination of hardware and software. In the present disclosure, operations described as being performed by the validation module 108 may include operations that the validation module 108 may direct a corresponding system (e.g., the computing system 102) to perform.

The source rule module 110 may include code and routines configured to enable the computing system 102 to perform one or more operations with respect to verifying the modified NNT 122. Additionally or alternatively, the source rule module 110 may be implemented using hardware including a processor, a microprocessor (e.g., to perform or control performance of one or more operations), a field-programmable gate array (FPGA), or an application-specific integrated circuit (ASIC). In some other instances, the source rule module 110 may be implemented using a combination of hardware and software. In the present disclosure, operations described as being performed by the source rule module 110 may include operations that the source rule module 110 may direct a corresponding system (e.g., the computing system 102) to perform.

In some embodiments, the NNT module 104 may obtain the data file 127 from the NNT library database 124. In some embodiments, a copy of the data file 127 may be stored in the memory 112. In some embodiments, the data file 127 may include information that describes the NNT and components of the NNT. In these and other embodiments, the components may include neural nodes, blocks, connections between the neural nodes and/or the blocks, and information corresponding to functions of the neural nodes, the blocks, and/or the connections. Additionally or alternatively, the data file 127 may include information describing a combination of NNTs. For example, a hybrid of different graph-based models. In some embodiments, the information may also describe the layers, the neural network inputs, the neural network outputs, and the neural network weights that control the machine learning of the neural network.

The NNT module 104 may direct display of the NNT via the GUI on the display screen 120. Each of the components of the NNT may be displayed via the GUI. The NNT may be displayed as a global view, a block view, or a neuron view. The global view may include a high-level display of the NNT including blocks or neural nodes in a way that shows zones in a manner that is similar to the Language area, Motricity area, Visual area in a human brain). In some embodiments, the global view may be configured to be modified and to include a functional activity view as discussed in more detail below.

The block view may include multiple blocks (e.g., graphical objects) that represent groupings of neural nodes and connections that associate the different blocks. For example, a first block may represent ten different neural nodes, a second block may represent five different neural nodes, and the connections may connect the first block to the second block. Alternatively, the block view may include blocks, specific neural nodes, and connections associating the blocks and the specific neural nodes to each other. In some embodiments, the user may be able to zoom in on a particular block to view at least a portion of the neural nodes that the block represents. The neuron view may include neural nodes and connections associating the neural nodes to each other. In some embodiments, the NNT may be displayed via the GUI in a two-dimensional manner. In other embodiments, the NNT may be displayed via the GUI in a three-dimensional manner.

The NNT module 104 may also direct display of the information corresponding to the NNT. For example, the information corresponding to the NNT may describe the layers, the neural nodes, the neural network inputs, the neural network outputs, component weights, and interconnection of this information.

The NNT module 104 may detect user input received via the GUI. In some embodiments, the user input (e.g., an initial user input) may be effective to indicate a subset of components within the NNT are to be modified by the NNT module 104. In these and other embodiments, the user input may be effective to indicate the subset of components are to be grouped for modification. For example, the NNT may include ten components and the user input may indicate four of the components are to be grouped for modification.

The NNT module 104 may identify information in the data file 127 that corresponds to the selected subset of components. In addition, in some embodiments, the NNT module 104 may cause one or more attributes of the components displayed via the GUI to change to indicate the components are associated with the user input. For example, the NNT module 104 may direct the display of a connection between neural nodes to change colors (e.g., grey to red) in response to the connection being selected. As another example, the NNT module 104 may direct the display of a neural node to be highlighted in the GUI.

Additional user input may be received indicating that components of the NNT or of the subset of components of the NNT are to be modified. The NNT module 104 may modify the information in the data file 127 that corresponds to the selected components based on the additional user input. Example modifications may include removing a connection, removing a neural node, removing a block, adding a neural node, adding a connection, adding a block, replacing a neural node with another neural node, changing a location of a neural node within the NNT, or any other appropriate action. Additional example modifications may include altering one or more properties such as altering the component weight.

Example types of modifications to components may be disclosed in provisional application 62/613,514 filed on Jan. 4, 2018, the contents of which are incorporated by reference in its entirety. Examples of the user input and the additional user input may include using a mouse or similar device to "click" on a component, the mouse or similar device to "drag" a component, or a keyboard or similar device to enter alphanumeric characters to change the information associated with a component. Additional examples of the user input and the additional user input may include typing, inserting, swiping, tapping, touching, voice commands, motion sensory inputs, or any other suitable input, e.g., via mechanisms such as tactile or haptic mechanisms or via computer accessory mechanisms (e.g., a mouse, track pad, digital pen, accelerometer, virtual reality gloves, etc.).

In some embodiments, the user input and the additional user input may be combined into a single action made by the user via the GUI. In other embodiments, the user input and the additional user input may each include separate actions made by the user via the GUI. Alternatively, the user input, the additional user input, or both the user input and the additional user input may include multiple actions made by the user via the GUI. For example, the user input may include a single action made by the user via the GUI and the second user input may include multiple separate actions made by the user via the GUI. As another example, the first user input may include multiple separate actions made by the user via the GUI and the second user input may include a single action made by the user via the GUI. As yet another example, the first user input may include multiple separate actions made by the user via the GUI and the additional user input may also include multiple separate actions made by the user via the GUI.

The NNT module 104 may generate the modified NNT 122 based on the user input and/or the additional user input. In some embodiments, the NNT module 104 may generate the modified NNT 122 based on the data file 127 after being modified. In addition, the NNT module 104 may direct display of the modified NNT 122 via the GUI on the display screen 120.

In some embodiments, the source rule module 110 may obtain the source rules data file 129 from the source network database 128. In these and other embodiments, a copy of the source rules data file 129 may be stored in the memory 112. The source rules data file 129 may include information describing source rules of the graph model. The source rule module 110 may be configured to determine whether the modified NNT 122 breaks any of the source rules (e.g., verify the modified NNT 122). In some embodiments, the source rule module 110 may compare the information in the data file 127 that was modified to the source rules in the source rules data file 129. Example source rules may include how the modified NNT 122 is to communicate with the source entity network (e.g., the NNT library database 124, the source network database 128, and/or the data source 125) or how the neural nodes and/or blocks may be looped. If the modified NNT 122 does not break a source rule, the source rule module 110 may notify the NNT module 104 that the modified NNT 122 is verified and to proceed using the modified NNT 122.

If the modified NNT 122 (e.g., the modified information in the data file 127) breaks a source rule (e.g., the modified NNT 122 does not verify), the source rule module 110 may direct display of a notice via the GUI. In some embodiments, the notice may include information describing the source rules that the modified NNT 122 breaks. In these and other embodiments, the notice may include information describing portions of the modified NNT 122 that breaks the source rules. In some embodiments, the notice may also include an option (e.g., a request) to confirm proceeding using the modified NNT 122 despite the modified NNT 122 not being verified. In these and other embodiments, the notice may include an option to revert back to the NNT prior to the modifications (e.g., undo the modifications).

The NNT module 104 may direct display of the modified NNT 122 via the GUI. In some embodiments, the NNT module 104 may direct display of the modified NNT 122 as part of the process of verifying the modified NNT 122. In other embodiments, the NNT module 104 may direct display of the modified NNT 122 after the modified NNT 122 is verified.

In some embodiments, additional user input may be received indicating that information corresponding to a component of the modified NNT 122 is to be displayed via the GUI. In other embodiments, additional user input may be received indicating that information corresponding to a subset of the components of the modified NNT 122 is to be displayed via the GUI. The NNT module 104 may identify information in the data file 127 that corresponds to the selected component or selected subset of components. The NNT module 104 may direct display of the information in the data file 127 that corresponds to the selected component or selected subset of components via the GUI. In some embodiments, the information corresponding to the selected components or selected subset of components may include properties of the components. For example, the properties may include a component name, a component identifier, a component bias, a component function, a component direction (e.g., whether the component is a source component or a target component), corresponding layers, component inputs, component outputs, component weights, and/or corresponding connections. As a specific example, the properties may include "source: 10" and "target: 5."

The validation module 108 may obtain the validation dataset 118 from the data source 125. In some embodiments, a copy of the validation dataset 118 may be stored in the memory 112. The validation dataset 118 may include information configured to be used with the modified NNT 122 to determine if machine learning results using the modified NNT 122 are valid. The validation module 108 may generate validation machine learning results based on machine learning performed using the modified NNT 122 and the validation dataset 118.

In some embodiments, the data file 127 may include a pre-selected NNT. In other embodiments, the validation dataset 118 may include the pre-selected NNT. In some embodiments, the pre-selected NNT may be an NNT that is already verified and validated. In these and other embodiments, the pre-selected NNT may be the NNT prior to modification based on the user inputs. In addition, the pre-selected NNT may be directed to the same or similar problem that the modified NNT 122 is directed to. In some embodiments, the validation module 108 may generate comparison machine learning results using the pre-selected NNT and the validation dataset. In other embodiments, instead of the pre-selected NNT, the validation dataset 118 may include the comparison machine learning results.

In some embodiments, the validation module 108 may compare the comparison machine learning results to the validation machine learning results. In these and other embodiments, the validation module 108 may compare the comparison machine learning results to the validation machine learning results to determine if the modified NNT 122 generated the same or similar machine learning results as the pre-selected NNT. In some embodiments, the modified NNT 122 may be validated if a percentage of the validation machine learning results that are the same or similar to the comparison machine learning results exceeds a threshold value. In some embodiments, the threshold value may be pre-selected by a developer of the validation module 108. In other embodiments, the threshold value may be selected by the user. If the modified NNT 122 is validated, the validation module 108 may notify the NNT module 104 to proceed using the modified NNT 122.

If the modified NNT 122 is not validated, the validation module 108 may determine an additional modification to the modified NNT 122. The additional modification may be determined based on the comparison of the validation machine learning results and the comparison machine learning results. In some embodiments, the additional modification may be determined to cause the modified NNT 122 to operate in accordance with the source rules. For example, if the modified NNT 122 includes a neural node loop that breaks the source rules, the additional modification may include an arrangement of the neural nodes that does not break the source rules and provides the same or similar machine learning results as the modified NNT 122 prior to the additional modification. In these and other embodiments, the modified NNT 122 may break multiple source rules and the additional modification may include multiple proposed modifications that correct errors in a hierarchical order. The hierarchical order may be included the source rules data file 129.

The validation module 108 may direct display of a recommendation to modify the modified NNT 122. The recommendation may include the additional modification. In some embodiments, the recommendation may include an option to accept or reject the additional modification. If the additional modification is rejected, the validation module 108 may indicate to the NNT module 104 that the modified NNT 122 is not validated but to proceed. If the additional modification is accepted, the validation module 108 may repeat the process discussed above using the modified NNT 122 including the additional modification to determine if the modified NNT 122 now validates. In some embodiments, the validation module 108 may be included in a device associated and/or maintained by the source network. In these and other embodiments, the operations of the validation module 108 may be performed on the device associated and/or maintained by the source network.

In some embodiments, the NNT module 104 may also direct display of functional activity information of the modified NNT 122. In these and other embodiments, the functional activity information may include a recorded time interval of functional activity of the modified NNT 122 or a real-time functional activity of the modified NNT 122.

Additionally or alternatively, the functional activity information may include information describing operation and/or performance of machine learning using the modified NNT 122 and a dataset (e.g., the testing dataset). Further, the functional activity may include information describing activity of the components within the modified NNT 122, which components in the modified NNT 122 are the most active, which components in the modified NNT 122 are the least active, any components in the modified NNT 122 that are unused. The functional activity may permit the user to determine whether or how to further modify the modified NNT 122.

In some embodiments, the testing module 106 may obtain the testing dataset 116 from the data source 125. In these and other embodiments, a copy of the testing dataset 116 may be stored in the memory 112. Additionally or alternatively, the functional activity information may be determined based on machine learning using the modified NNT 122 and the testing dataset 116. For example, the testing module 106 may perform machine learning using the modified NNT 122 and the testing dataset 116. In some embodiments, the recorded time interval of functional activity may include information describing an amount of time it took to the testing module 106 perform machine learning using the modified NNT 122 and the testing dataset 116. In these and other embodiments, the real-time functional activity may information describing how much time has elapsed since the testing module 106 started performing machine learning using the modified NNT 122 and the testing dataset 116. Additionally or alternatively, the functional activity information may include the information describing activity of the components within the modified NNT 122, which components in the modified NNT 122 are the most active, which components in the modified NNT 122 are the least active, any components in the modified NNT 122 that are unused. dynamic view of activity over time of learning from dataset or inferencing new datas In some embodiments, the recorded time interval and/or the real-time functional activity may be a video clip or time lapse of functional activity within the modified NNT 122. In other embodiments, the functional activity information may include a real-time functional activity of the modified NNT 122 using the testing dataset 116. For example, the real-time functional activity may include an elapsed amount of time since the machine learning started.

In some embodiments, the functional activity information may include a simulation of where and/or how functional activity within the modified NNT 122 takes place. In another example, the real-time functional activity may indicate functional activity of the neural network in real-time (or approximately real-time) as the neural network interacts with or processes the testing dataset 116. In some embodiments, the testing dataset 116 may include live data, training data, testing data, or other suitable input data for analyzing functionality of the neural network.

Figure 2:
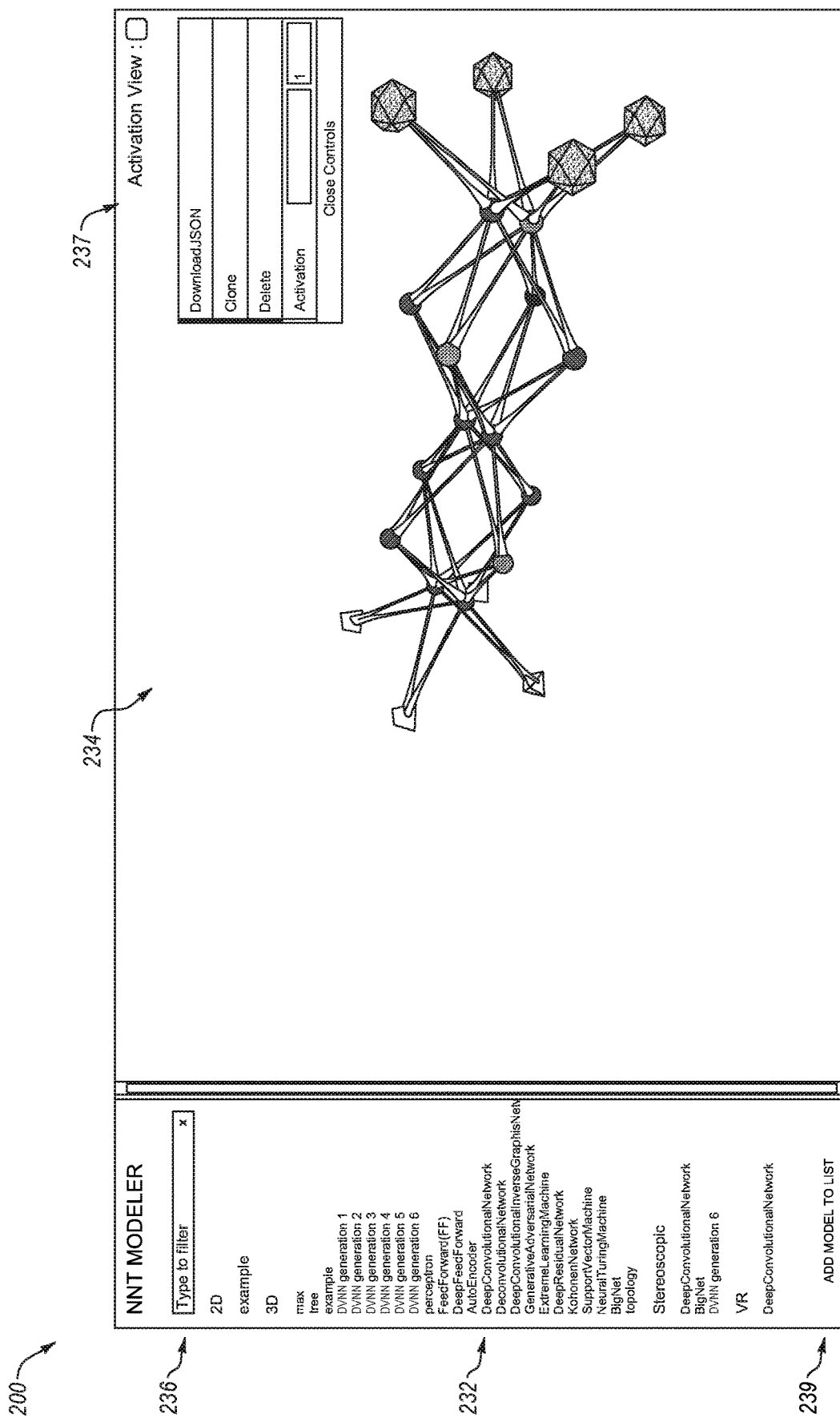
FIG. 2 illustrates a screen shot of the GUI that includes a selection field, an NNT view and management field, and model modeler control fields that may be implemented in the computing system of FIG. 1

FIG. 2 illustrates a screen shot 200 of the GUI that includes selection fields 232, 236, and 239, an NNT view and management field 234, and model modeler control fields 237 that may be implemented in the computing system 102 of FIG. 1, arranged in accordance with at least one embodiment described in the present disclosure. The NNT view and management field 234 may display an example NNT. In some embodiments, the example NNT displayed in the NNT view and management field 234 may correspond to the NNT prior to being modified or the modified NNT 122 of FIG. 1. As illustrated in FIG. 2, a deep belief network graph-based model is selected and displayed in the NNT view and management field 234. In addition, the components of the example NNT displayed in the NNT view and management field 234 may include a configuration, size, shape, number of neural nodes, connections between neural nodes, function of neural nodes, weight or bias of neural nodes that correspond to the operation of the corresponding components.

As illustrated in FIG. 2, the selection field 232 may include multiple links to data representative of example NNTs. For example, the selection field 232 includes a listing of NNTs (e.g., graph-based NNT models) configured to be modified via a user input received via the GUI. In addition, as illustrated in FIG. 2, the selection field 236 includes a drop-down box configured to pre-populate with filter types. For example, the filter types may include types of graph-based NNT models that may be displayed in the NNT view and management field 234. The filter types may be configured to be selected by the user to apply particular filters to the graph-based NNT models for the NNTs that are visible in the selection field 232. Further, as illustrated in FIG. 2, the selection field 236 includes drop down boxes configured to pre-populate with display types. For example, the display types may include options for displaying the example NNT in the NNT view and management field 234 as a two-dimensional or a three-dimensional representation. The selection field 239 includes an "ADD MODEL TO LIST" button. The "ADD MODEL TO LIST" button may be configured to be selected by the user to add graph-based NNTs to the selection field 232.

The model modeler control fields 237 may include a "DownloadJSON" button, a "Clone" button, a "Delete" button, an "Activation view" field, an "Activation" field, and a "Close Controls" button. The "DownloadJSON" may be configured to be selected by the user to download a version of the NNT displayed in the NNT view and management field 234 according to a particular format. In some embodiments, the particular format may include JavaScript Object Notation (JSON) format. The "Clone" button may be configured to be selected by the user to clone the NNT displayed in the NNT view and management field 234. The "Delete" button may be configured to be selected by the user to delete the NNT displayed in the NNT view and management field 234. The "Activation view" field may be configured to be selected by the user to display functional activity of the NNT displayed in the NNT view and management field 234 during machine learning operations. The "Activation" field may display a number of components of the NNT displayed in the NNT view and management field 234 that are currently active. The "Close Controls" button may be configured to be selected by the user minimize the model modeler control fields 237 as illustrated in FIG. 4B.

Figure 3A:
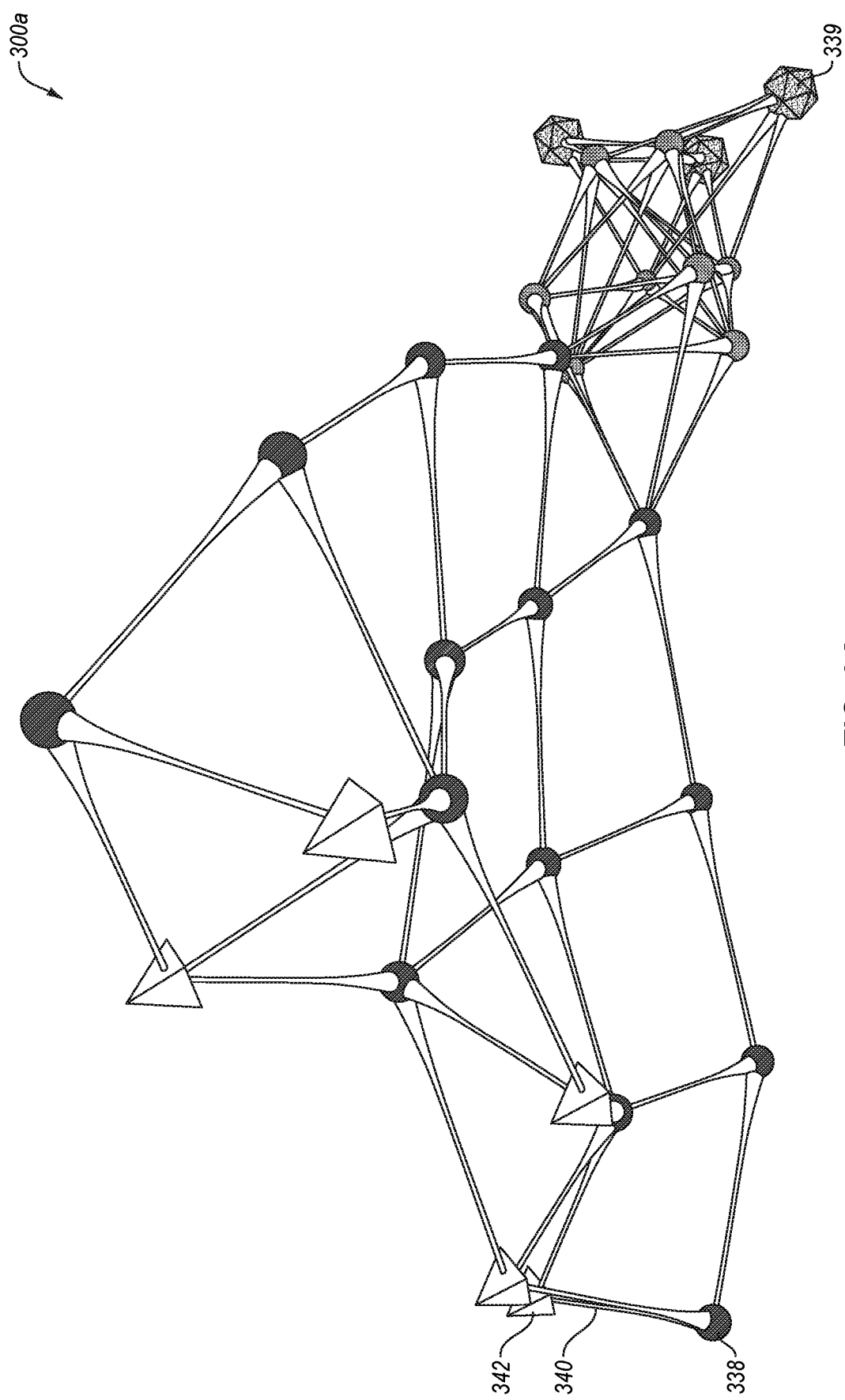
FIG. 3A illustrates a screen shot of an example NNT that may be displayed as a three-dimensional representation via the NNT view and management field of the GUI in FIG. 2.

FIG. 3A illustrates a screen shot 300a of an example NNT that may be displayed as a three-dimensional representation via the NNT view and management field 234 of the GUI in FIG. 2, arranged in accordance with at least one embodiment described in the present disclosure. FIG. 3A illustrates a three-dimensional representation of the example NNT. The example NNT may include neural nodes 338, 339, 342 and connections 340. The connection 340 may associate two neural nodes (e.g., neural nodes 338, 342). In FIG. 3A, a single connection is denoted as 340 to illustrate an example connection. In some embodiments, the neural node 338 may represent a first neural node type. In these and other embodiments, the neural node 342 may represent a second neural node type. Additionally or alternatively, the neural node 339 may illustrates a third neural node type. As illustrated in FIG. 3A, the first neural node type may be represented in the example NNT as a sphere, the second neural node type may be represented in the example NNT as a pyramid, and the third neural node type may be represented in the NNT as a five or mode sided shape. For example, the five or more-sided shape may include an octahedron, a pentagonal trapezohedron, a dodecahedron, an icosahedron, or any other five or more-sided shape. In FIG. 3A, a single first neural node type is denoted as 338 to illustrate an example neural node of the first neural node type. In addition, in FIG. 3A, a single second neural node type is denoted as 342 to illustrate an example neural node of the second neural node type. Further, in FIG. 3A, a single third neural node type is denoted as 339 to illustrate an example neural node of the third neural node type.

Figure 3B:
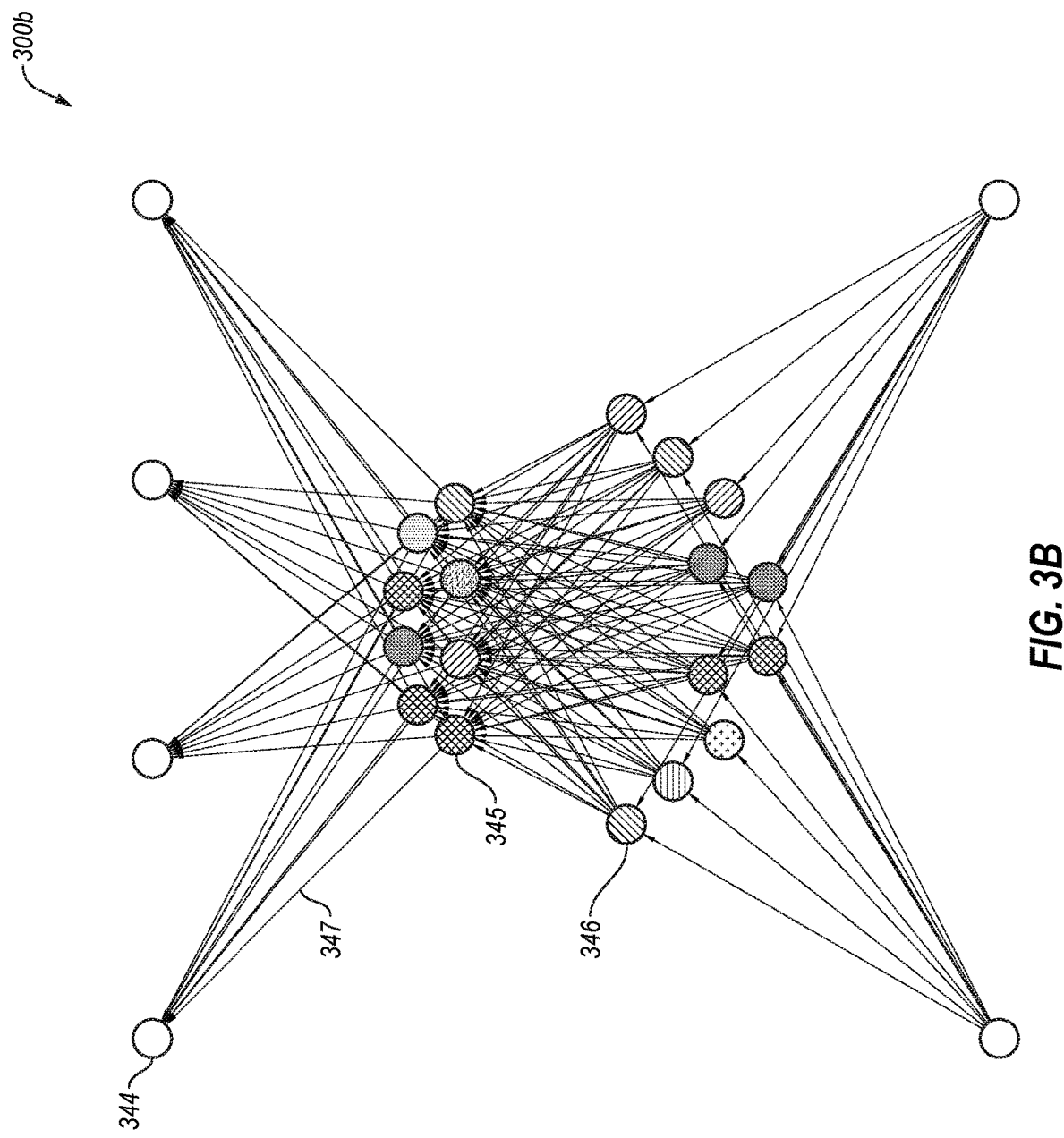
FIG. 3B illustrates another screen shot of an example NNT that may be displayed as a two-dimensional representation via the NNT view and management field of the GUI in FIG. 2.

FIG. 3B illustrates another screen shot 300b of an example NNT that may be displayed as a two-dimensional representation via the NNT view and management field 234 of the GUI in FIG. 2, arranged in accordance with at least one embodiment described in the present disclosure. FIG. 3B illustrates a two-dimensional representation of the example NNT. The example NNT may include neural nodes 344, 345, 346 and connections 347. The connection 347 may associate two neural nodes (e.g., neural nodes 344, 345). In FIG. 3B, a single connection is denoted as 347 to illustrate an example connection. In some embodiments, the connections may indicate a flow of operation. For example, the connections may be illustrated as arrows. The arrows may indicate from which neural node information comes from and to which neural node information goes to. For example, as illustrated in FIG. 3B, connection 347 may indicate that operation and information may come from neural node 345 and go to neural node 344. As illustrated in FIG. 3B, operation and information may generally flow from the bottom to the top. As an example, the two lowest neural nodes may include neural network inputs in which information is provided to the neural network. Further, as an example, the four highest neural nodes may include neural network outputs in which information is extracted from the neural network.

Figure 4A:
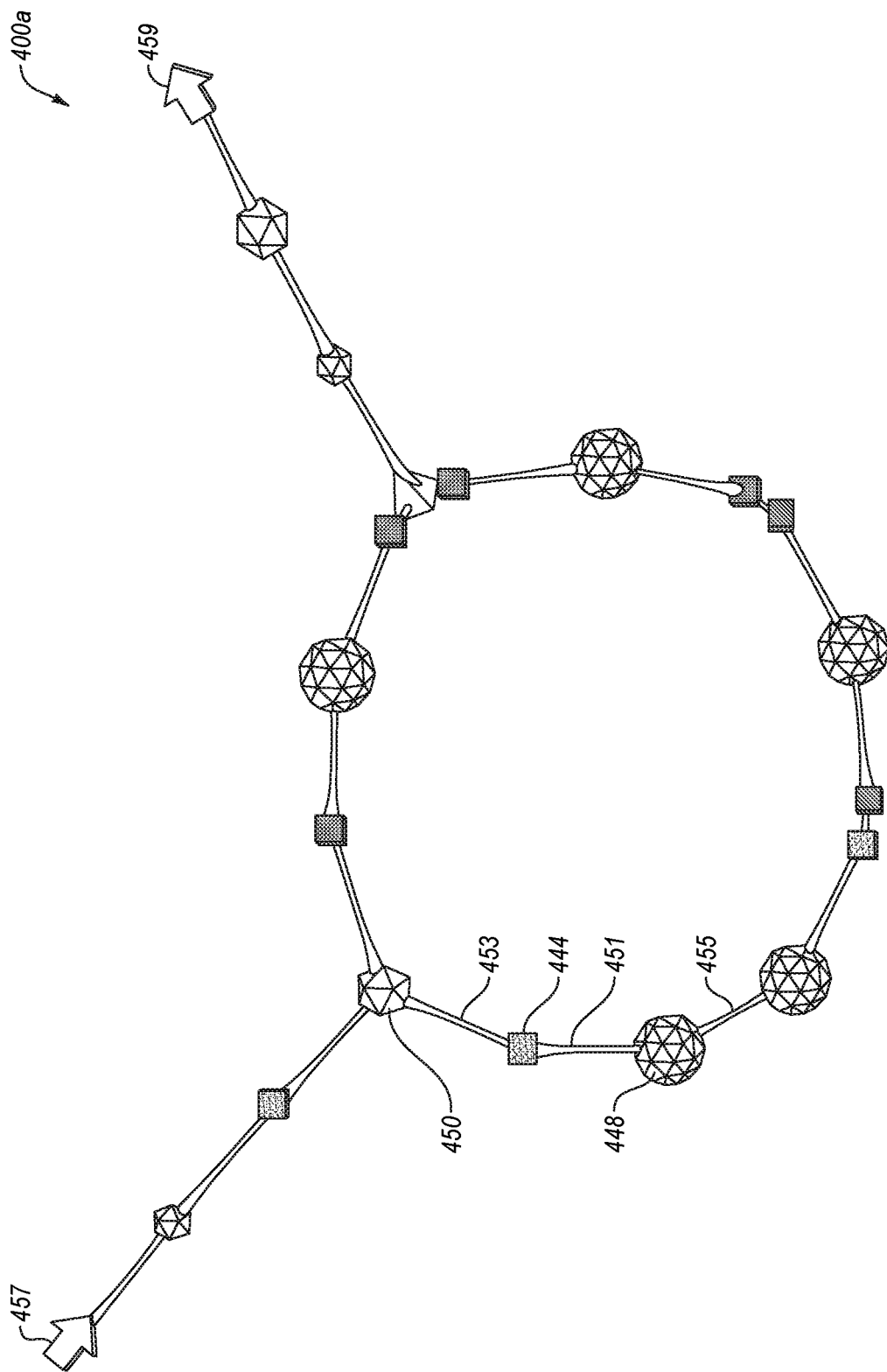
FIG. 4A illustrates a screen shot of an example block NNT that may be displayed as a three-dimensional representation via the NNT view and management field of the GUI of FIG. 2.
Figure 4B:
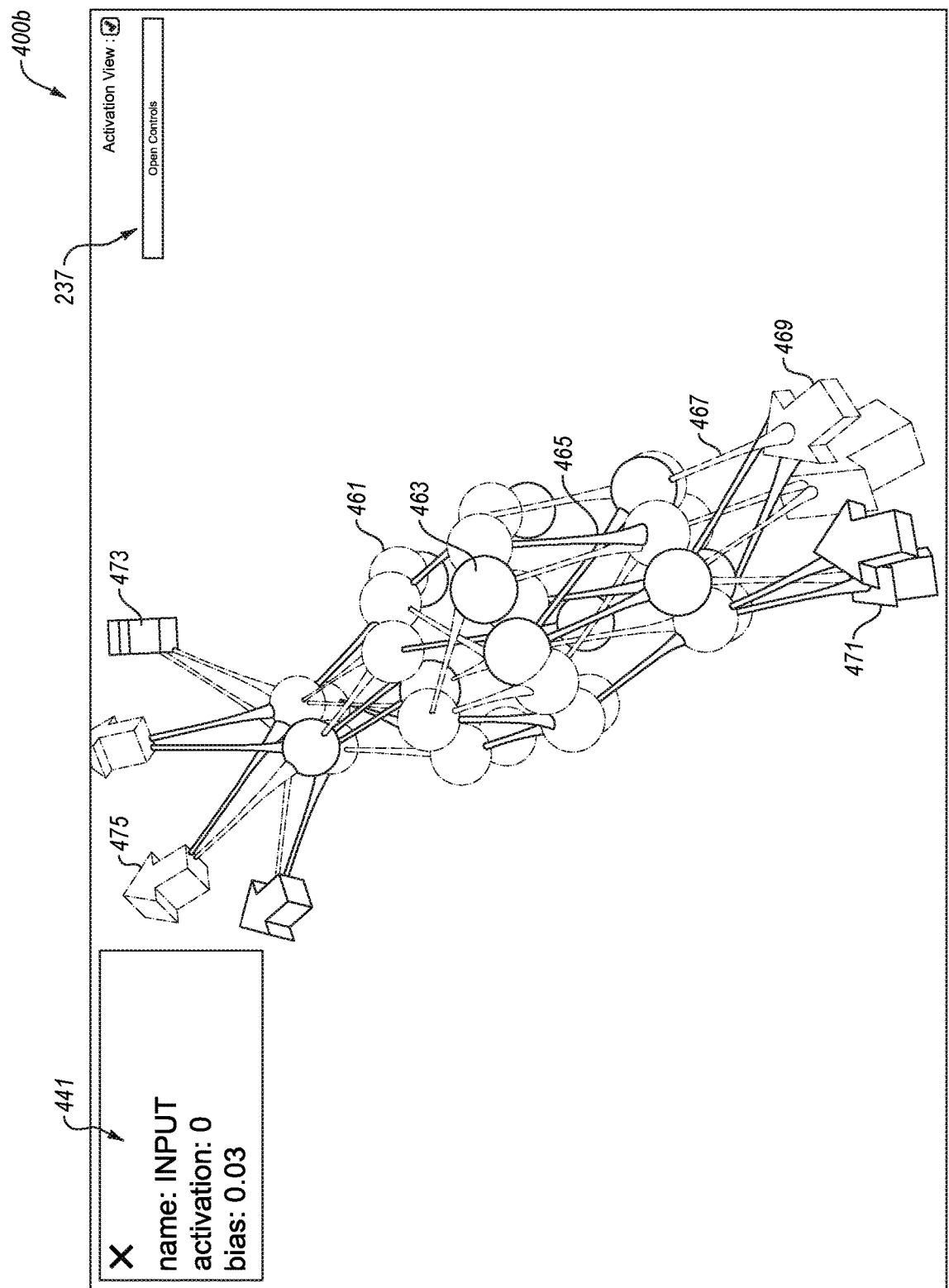
FIG. 4B illustrates a screen shot of an activation view (RMi F) of an example NNT that may be displayed as a three-dimensional representation via the NNT view and management field of the GUI of FIG. 2.

FIG. 4A illustrates a screen shot 400a of an example block NNT that may be displayed as a three-dimensional representation via the NNT view and management field 234 of the GUI of FIG. 2, arranged in accordance with at least one embodiment described in the present disclosure. FIG. 4A illustrates a three-dimensional representation of the example NNT. The example NNT may include blocks 448, 450, neural nodes 444, connections 451, 453, 455, a neural network input 457, and a neural network output 459. In some embodiments, the connections may associate two blocks (e.g., connection 455). In these and other embodiments, the connections may associate a block and a neural node (e.g., connections 451, 453). In some embodiments, the neural network input 457 and the neural network output 459 may indicate a flow of information and/or operation. For example, the neural network input 457 may indicate a point in the NNT in which information is provided to the neural network. Further, as an example, the neural network output 459 may indicate a point in the NNT in which information is extracted from the neural network.

The blocks (e.g., blocks 448, 450) may represent subsets of neural nodes. In some embodiments, the user may be able to zoom in on a particular block to view at least a portion of the neural nodes that the block represents. In some embodiments, the individual neural nodes within the blocks (e.g., block 448, 450) may be connected to each other and/or connected with the blocks. For example, a first neural node within a first block may be connected to a second neural node within a second block via a connection between the first block and the second block and one or more respective connections between the first neural node and the first block and between the second neural node and the second block. Additionally or alternatively, the blocks may be a graphical representation of a group of individual neural nodes, and not necessarily a governing entity through which individual neural nodes communicate information.

FIG. 4B illustrates a screen shot 400b of an activation view (RMi F) of an example NNT that may be displayed as a three-dimensional representation via the NNT view and management field 234 of the GUI of FIG. 2, arranged in accordance with at least one embodiment described in the present disclosure. The example NNT may include neural nodes (e.g., neural nodes 461, 463) connections (e.g., connections 465, 467), neural network inputs (e.g., neural network inputs 469, 471, and neural network outputs (e.g., neural network outputs 473, 475). In some embodiments, the neural network inputs and the neural network outputs may indicate a flow of information and/or operation. For example, the neural network inputs may indicate points in the NNT in which information is provided to the neural network. As another example, the neural network outputs may indicate a point in the NNT in which information is extracted from the neural network. In FIG. 4B, two neural nodes 461, 463, two connections 465, 467, two neural network inputs 469, 471 and two neural network outputs 473, 475 are denoted to illustrate specific examples of the different components.

The activation view (RMi F) of the example NNT may indicate which components of the NNT are currently active and which are currently inactive. For example, currently active components may be colored a first color (e.g., light blue) and inactive components may be colored a second color (e.g., white). As illustrated in FIG. 4B, the active components are illustrated as including a hashing and the inactive components are illustrated as not include a hashing. As illustrated in FIG. 4B, Neural node 461 is an example active neural node while neural node 463 is an example inactive neural node. In addition, as illustrated in FIG. 4B, connection 467 is an example active connection and connection 465 is an example inactive connection. Further, as illustrated in FIG. 4B, neural network input 469 is an example active neural network input and neural network input 471 is an example inactive neural network input. As illustrated in FIG. 4B, neural network output 475 is an example active neural node and neural network output 473 is an example inactive neural network output.

In addition, the screen shot 400b includes an information field 441 and the model modeler control fields 237. The information field 441 may display properties of a selected component of the NNT. For example, as illustrated in FIG. 4B, the properties may in "name: INPUT," which may include the name of the selected component; "activation: 0," which may indicate the selected component is inactive; and "bias: 0.03," which may indicate the selected component has a weight of 0.03. The "Open Controls" button of the model modeler control fields 237 may be configured to be selected by the user to expand the model modeler control fields 237 as illustrated in FIG. 2.

Figure 5:
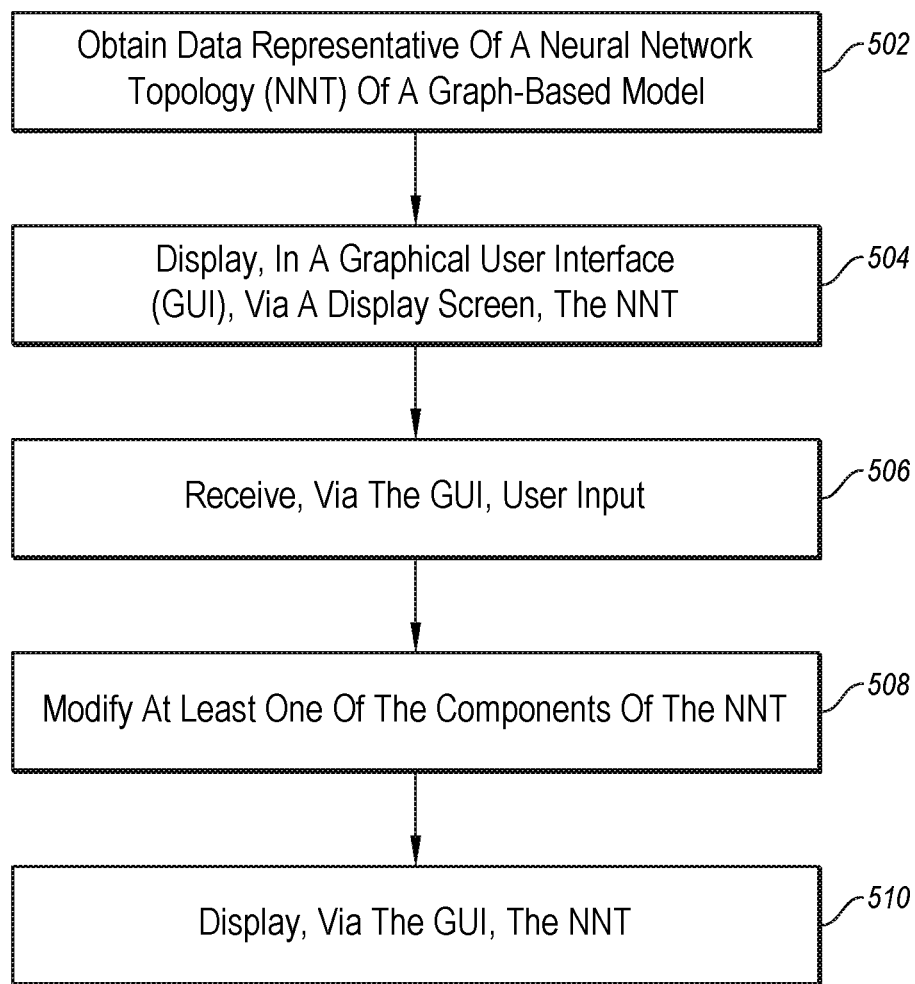
FIG. 5 illustrates a flowchart of a method to modify an NNT.

FIG. 5 illustrates a flowchart of a method to modify an NNT, arranged in accordance with at least one embodiment described in the present disclosure. The method 500 may be programmably performed or controlled by a processor in, e.g., a computer and/or server that executes a browser and/or other application to modify the NNT. In an example implementation, the method 500 may be performed in whole or in part by the NNT module 104, the testing module 106, the validation module 108, and/or the source rule module 110 of FIG. 1. The method 500 may include one or more of blocks 502, 504, 506, 508, and/or 510. The method 500 may begin at block 502.

At block 502, data representative of an NNT of a graph-based model may be obtained. For example, the NNT module 104 of FIG. 1 may obtain the data file 127 from the NNT library database 124 of FIG. 1. In some embodiments, the NNT may include multiple components. In some embodiments, the multiple components may include neural nodes and at least one connection that associates the neural nodes. In these and other embodiments, the components may include blocks that represent subsets of neural nodes. Block 502 may be followed by block 504.

At block 504, the NNT may be displayed in a GUI via the display screen. The NNT displayed in the GUI via the display screen may include the components. For example, the NNT may displayed in the GUI via the display screen 120 of FIG. 1. Block 504 may be followed by block 506. At block 506, user input may be received via the GUI. The user input may be effective to indicate that at least one of the components of the NNT is to be modified. For example, the user input may indicate that a neural node is to be moved within the NNT. Block 506 may be followed by block 508.

At block 508, at least one of the components of the NNT is modified. In some embodiments, the NNT module 104 of FIG. 1 may modify data in the data file 127 of FIG. 1. Block 508 may be followed by block 510. At block 510, the NNT may be displayed via the GUI. In some embodiments, the NNT that comprises the modification of the at least one of the components may be displayed via the GUI. For example, the modified NNT 122 of FIG. 1 may be displayed via the GUI.

One skilled in the art will appreciate that, for this and other processes and methods disclosed in the present disclosure, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

Figure 6:
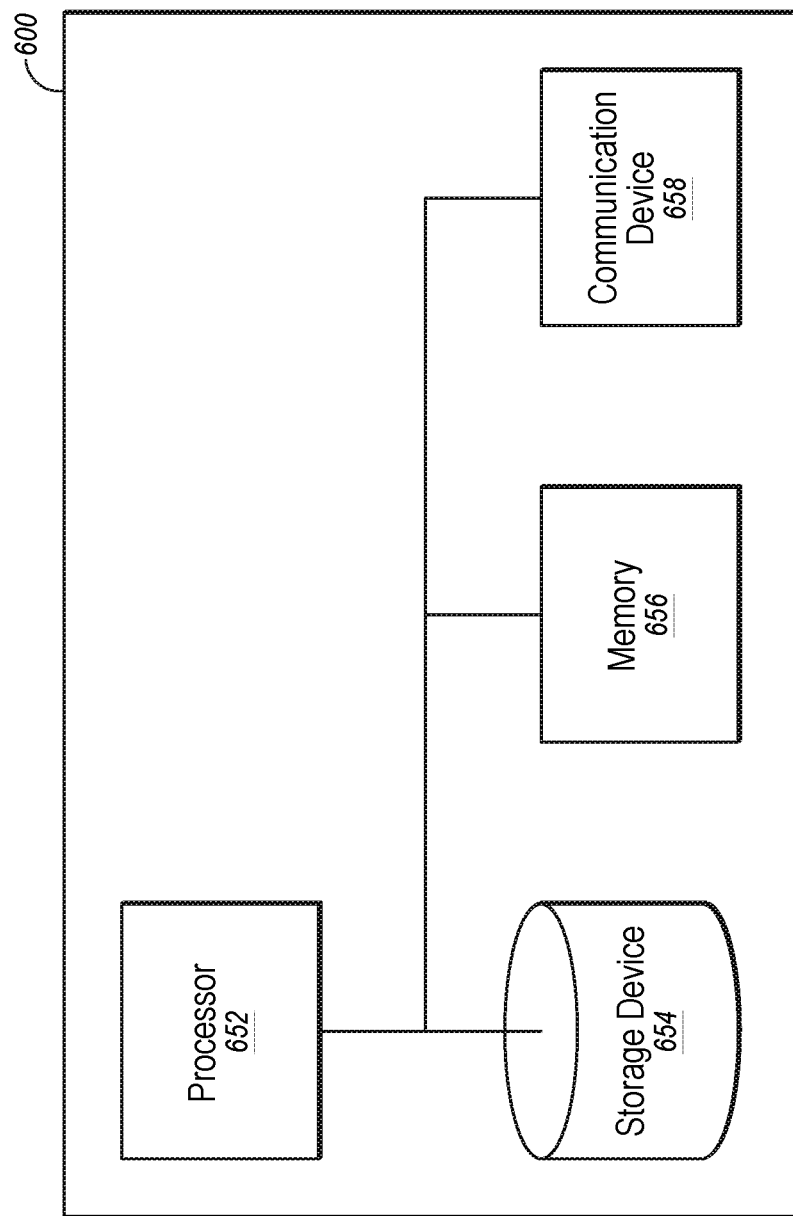
FIG. 6 is a block diagram of an example computing system, all according to at least one embodiment described in the present disclosure.

FIG. 6 is a block diagram of an example computing system, arranged in accordance with at least one embodiment described in the present disclosure. The computing system 600 may be included in the computing system 102 of FIG. 1, in some embodiments. Additionally or alternatively, the computing system 600 may be included in a desktop computer, a laptop computer, a server computer, a tablet computer, a mobile phone, a smartphone, a personal digital assistant (PDA), an e-reader device, a network switch, a network router, a network hub, other networking devices, or other suitable computing device.

The computing system 600 may include a processor 652, a storage device 654, a memory 656, and a communication device 658. The processor 652, the storage device 654, the memory 656, and/or the communication device 658 may all be communicatively coupled such that each of the components may communicate with the other components. The computing system 600 may perform any of the operations described in the present disclosure.

In general, the processor 652 may include any suitable special-purpose or general-purpose computer, computing entity, or processing device including various computer hardware or software modules and may be configured to execute instructions stored on any applicable computer-readable storage media. For example, the processor 652 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 6, the processor 652 may include any number of processors configured to perform, individually or collectively, any number of operations described in the present disclosure.

In some embodiments, the processor 652 may interpret and/or execute program instructions and/or process data stored in the storage device 654, the memory 656, or the storage device 654 and the memory 656. In some embodiments, the processor 652 may fetch program instructions from the storage device 654 and load the program instructions in the memory 656. After the program instructions are loaded into the memory 656, the processor 652 may execute the program instructions.

For example, in some embodiments, one or more of the processing operations for the computing system 600 may be included in the storage device 654 as program instructions. The processor 652 may fetch the program instructions of one or more of the processing operations and may load the program instructions of the processing operations in the memory 656. After the program instructions of the processing operations are loaded into the memory 656, the processor 652 may execute the program instructions such that the computing system 600 may implement the operations associated with the processing operations as directed by the program instructions. The modules described above with respect to FIG. 1 may be examples of program instructions that may be included in the storage device 654.

The storage device 654 and the memory 656 may include computer-readable storage media for carrying or having computer-executable instructions or data structures stored thereon. Such computer-readable storage media may include any available media that may be accessed by a general-purpose or special-purpose computer, such as processor 652. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 652 to perform a certain operation or group of operations.

In some embodiments, the storage device 654 and/or the memory 656 may store data associated with modifying the NNT. For example, the storage device 654 and/or the memory 656 may store the testing dataset 116, the validation dataset 118, the data file 127, the source rules data file 129, or the modified NNT 122, or any other appropriate form of data discussed in the present disclosure.

The communication device 658 may include any device, system, component, or collection of components configured to allow or facilitate communication between the computing system 600 and another electronic device. For example, the communication device 658 may include, without limitation, a modem, a network card (wireless or wired), an infrared communication device, an optical communication device, a wireless communication device (such as an antenna), and/or chipset (such as a Bluetooth device, an 802.6 device (e.g., Metropolitan Area Network (MAN)), a Wi-Fi device, a WiMAX device, cellular communication facilities, etc.), and/or the like. Communication device 658 may permit data to be exchanged with any network such as a cellular network, a Wi-Fi network, a MAN, an optical network, etc., to name a few examples, and/or any other devices described in the present disclosure, including remote devices.

Modifications, additions, or omissions may be made to FIG. 6 without departing from the scope of the present disclosure. For example, the computing system 600 may include more or fewer elements than those illustrated and described in the present disclosure. For example, the computing system 600 may include an integrated display device such as a screen of a tablet or mobile phone or may include an external monitor, a projector, a television, or other suitable display device that may be separate from and communicatively coupled to the computing system 600.

In some configurations, a system (102, 600) may include one or more processors (652) configured to perform or control performance of operations. The operations may include obtaining data representative of an NNT of a graph-based model (127). The NNT (300a, 300b, 400a, 400b) may include multiple components (338, 339, 340, 342, 344, 345, 346, 347, 448, 449, 450, 451, 453, 455, 461, 463, 465, 467, 469, 471, 473, 475) that include multiple neural nodes (338, 339, 342, 344, 345, 346, 448, 449, 450, 461, 463) and at least one connection (340, 347, 451, 453, 455, 465, 467) that associates two or more of the neural nodes (338, 339, 342, 344, 345, 346, 448, 449, 450), 461, 463. The operations may also include displaying, in a GUI (200) via a display screen (120), the NNT (300a, 300b, 400a, 400b) including the multiple components (338, 339, 340, 342, 344, 345, 346, 347, 448, 449, 450, 451, 453, 455, 461, 463, 465, 467, 469, 471, 473, 475). In addition, the operations may include receiving, via the GUI (200), user input effective to indicate that at least one of the components (338, 339, 340, 342, 344, 345, 346, 347, 448, 449, 450, 451, 453, 455, 461, 463, 465, 467, 469, 471, 473, 475) of the NNT (300a, 300b, 400a, 400b) is to be modified. Further, the operations may include modifying the at least one of the components (338, 339, 340, 342, 344, 345, 346, 347, 448, 449, 450, 451, 453, 455, 461, 463, 465, 467, 469, 471, 473, 475) of the NNT (300a, 300b, 400a, 400b) based on the user input. The operations may include displaying, via the GUI (200), the NNT (300a, 300b, 400a, 400b) that comprises the modification of the at least one of the components (338, 339, 340, 342, 344, 345, 346, 347, 448, 449, 450, 451, 453, 455, 461, 463, 465, 467, 469, 471, 473, 475).

In some configurations, the operations may also include receiving, via the GUI (200), an additional user input effective to select the at least one of the components (338, 339, 340, 342, 344, 345, 346, 347, 448, 449, 450, 451, 453, 455, 461, 463, 465, 467, 469, 471, 473, 475) of the NNT (300a, 300b, 400a, 400b). In addition, the operations may include displaying, via the GUI (200), information describing one or more properties of the at least one of the components (338, 339, 340, 342, 344, 345, 346, 347, 448, 449, 450, 451, 453, 455, 461, 463, 465, 467, 469, 471, 473, 475).

In some configurations, the operations may also include obtaining a validation dataset (118). In addition, the operations may include generating validation machine learning results based on machine learning performed using the NNT (300a, 300b, 400a, 400b) that comprises the modification of the at least one of the components (338, 339, 340, 342, 344, 345, 346, 347, 448, 449, 450, 451, 453, 455, 461, 463, 465, 467, 469, 471, 473, 475) and the validation dataset (118). Further, the operations may include generating comparison machine learning results based on machine learning performed using a pre-selected NNT (116, 127) and the validation dataset (118). The operations may include validating the NNT (300a, 300b, 400a, 400b) that comprises the modification of the at least one of the components (338, 339, 340, 342, 344, 345, 346, 347, 448, 449, 450, 451, 453, 455, 461, 463, 465, 467, 469, 471, 473, 475) by comparing the validation machine learning results with the comparison machine learning results.

In some configurations, the operations may also include determining an additional modification to at least one of the components (338, 339, 340, 342, 344, 345, 346, 347, 448, 449, 450, 451, 453, 455, 461, 463, 465, 467, 469, 471, 473, 475) based on the comparison of the validation machine learning results with the comparison machine learning results. In addition, the operations may include providing a recommendation, via the GUI (200), relating to the modification of the at least one of the components (338, 339, 340, 342, 344, 345, 346, 347, 448, 449, 450, 451, 453, 455, 461, 463, 465, 467, 469, 471, 473, 475).

In some configurations, the operations may also include determining whether the modification of the at least one of the components (338, 339, 340, 342, 344, 345, 346, 347, 448, 449, 450, 451, 453, 455, 461, 463, 465, 467, 469, 471, 473, 475) is against one or more source rules (129) of a source network (128). Responsive to the modification of the at least one of the components (338, 339, 340, 342, 344, 345, 346, 347, 448, 449, 450, 451, 453, 455, 461, 463, 465, 467, 469, 471, 473, 475) being against one or more of the source rules (129), the operations may include a notice via the GUI (200) that includes information related to the one or more source rules (129) that that the modification of the at least one of the components (338, 339, 340, 342, 344, 345, 346, 347, 448, 449, 450, 451, 453, 455, 461, 463, 465, 467, 469, 471, 473, 475) will be against.

In some configurations, the operations may also include determining whether the modification of the at least one of the components (338, 339, 340, 342, 344, 345, 346, 347, 448, 449, 450, 451, 453, 455, 461, 463, 465, 467, 469, 471, 473, 475) is against one or more source rules (129) of a source network (128). Responsive to the modification of the at least one of the components (338, 339, 340, 342, 344, 345, 346, 347, 448, 449, 450, 451, 453, 455, 461, 463, 465, 467, 469, 471, 473, 475) not being against one or more of the source rules (129), the operations further comprise automatically proceeding with the modification of the at least one of the components (338, 339, 340, 342, 344, 345, 346, 347, 448, 449, 450, 451, 453, 455, 461, 463, 465, 467, 469, 471, 473, 475).

In some configurations, the operations may also include receiving, via the GUI (200), an initial user input effective to select an area of the NNT (300a, 300b, 400a, 400b) including a subset of the multiple components (338, 339, 340, 342, 344, 345, 346, 347, 448, 449, 450, 451, 453, 455, 461, 463, 465, 467, 469, 471, 473, 475). At least a portion of the subset of the multiple components (338, 339, 340, 342, 344, 345, 346, 347, 448, 449, 450, 451, 453, 455, 461, 463, 465, 467, 469, 471, 473, 475) is to be modified based on the user input.

In some configurations, the operations may also include indicating, via the GUI (200), a functional activity of the NNT (300a, 300b, 400a, 400b) that comprises the modification of the at least one of the components (338, 339, 340, 342, 344, 345, 346, 347, 448, 449, 450, 451, 453, 455, 461,

463, 465, 467, 469, 471, 473, 475). The functional activity of the NNT (300a, 300b, 400a, 400b) that comprises the modification of the at least one of the components (338, 339, 340, 342, 344, 345, 346, 347, 448, 449, 450, 451, 453, 455, 461, 463, 465, 467, 469, 471, 473, 475) includes at least one of a recorded time interval of functional activity and a real-time functional activity based on a testing dataset (116).

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner. Additionally, the term "about" or "approximately" should be interpreted to mean a value within 10% of actual value.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A method comprising:
   obtaining data representative of a neural network topology (NNT) of a graph-based model, the NNT comprising multiple components that include multiple neural nodes and at least one connection that associates two or more of the neural nodes;
   displaying, in a graphical user interface (GUI), via a display screen, the NNT including the multiple components;
   receiving, via the GUI, user input effective to indicate that at least one of the components of the NNT is to be modified;
   modifying the at least one of the components of the NNT based on the user input;
   determining whether the modification of the at least one of the components is against one or more source rules of a source network, wherein:
      responsive to the modification of the at least one of the components not being against one or more of the source rules, automatically proceeding with the modification of the at least one of the components; or
      responsive to the modification of the at least one of the components being against one or more of the source rules, providing a notice via the GUI that includes information related to the one or more source rules that the modification of the at least one of the components will be against; and
   displaying, via the GUI, the NNT that comprises the modification of the at least one of the components.

2. The method of claim 1 further comprising:
receiving, via the GUI, an additional user input effective to select the at least one of the components of the NNT; and
displaying, via the GUI, information describing one or more properties of the at least one of the components.

3. The method of claim 1 further comprising:
obtaining a validation dataset;
generating validation machine learning results based on machine learning performed using the NNT that comprises the modification of the at least one of the components and the validation dataset;
generating comparison machine learning results based on machine learning performed using a pre-selected NNT and the validation dataset; and
validating the NNT comprising the modification of the at least one of the components by comparing the validation machine learning results with the comparison machine learning results.

4. The method of claim 3 further comprising:
determining an additional modification to at least one of the components based on the comparison of the validation machine learning results with the comparison machine learning results; and
providing a recommendation, via the GUI, relating to the modification of the at least one of the components.

5. The method of claim 1 further comprising receiving, via the GUI, an initial user input effective to select an area of the NNT including a subset of the multiple components, wherein at least a portion of the subset of the multiple components is to be modified based on the user input.

6. The method of claim 1, further comprising indicating, via the GUI, a functional activity of the NNT that comprises the modification of the at least one of the components, wherein the functional activity of the NNT that comprises the modification of the at least one of the components includes at least one of a recorded time interval of functional activity and a real-time functional activity based on a testing dataset.

7. A system comprising:
one or more processors configured to perform or control performance of operations comprising:
obtaining data representative of a neural network topology (NNT) of a graph-based model, the NNT comprising multiple components that include multiple neural nodes and at least one connection that associates two or more of the neural nodes;
displaying, in a graphical user interface (GUI) via a display screen, the NNT including the multiple components;
receiving, via the GUI, user input effective to indicate that at least one of the components of the NNT is to be modified;
modifying the at least one of the components of the NNT based on the user input;
displaying, via the GUI, the NNT that comprises the modification of the at least one of the components;
obtaining a validation dataset;
generating validation machine learning results based on machine learning performed using the NNT that comprises the modification of the at least one of the components and the validation dataset;
generating comparison machine learning results based on machine learning performed using a pre-selected NNT and the validation dataset; and
validating the NNT that comprises the modification of the at least one of the components by comparing the validation machine learning results with the comparison machine learning results.

8. The system of claim 7, the operations further comprising:
receiving, via the GUI, an additional user input effective to select the at least one of the components of the NNT; and
displaying, via the GUI, information describing one or more properties of the at least one of the components.

9. The system of claim 7, the operations further comprising:
determining an additional modification to at least one of the components based on the comparison of the validation machine learning results with the comparison machine learning results; and
providing a recommendation, via the GUI, relating to the modification of the at least one of the components.

10. The system of claim 7, the operations further comprising determining whether the modification of the at least one of the components is against one or more source rules of a source network, wherein responsive to the modification of the at least one of the components being against one or more of the source rules, the operations further comprise providing a notice via the GUI that includes information related to the one or more source rules that that the modification of the at least one of the components will be against.

11. The system of claim 7, the operations further comprising determining whether the modification of the at least one of the components is against one or more source rules of a source network, wherein responsive to the modification of the at least one of the components not being against one or more of the source rules, the operations further comprise automatically proceeding with the modification of the at least one of the components.

12. The system of claim 7, the operations further comprising receiving, via the GUI, an initial user input effective to select an area of the NNT including a subset of the multiple components, wherein at least a portion of the subset of the multiple components is to be modified based on the user input.

13. The system of claim 7, the operations further comprising indicating, via the GUI, a functional activity of the NNT that comprises the modification of the at least one of the components, wherein the functional activity of the NNT that comprises the modification of the at least one of the components includes at least one of a recorded time interval of functional activity and a real-time functional activity based on a testing dataset.

14. A non-transitory computer-readable storage medium having computer-executable instructions stored thereon that are executable by a processor device to perform or control performance of operations comprising:
obtaining data representative of a neural network topology (NNT) of a graph-based model, the NNT comprising multiple components that include multiple neural nodes and at least one connection that associates two or more of the neural nodes;
displaying, in a graphical user interface (GUI) via a display screen, the NNT including the multiple components;
receiving, via the GUI, user input effective to indicate that at least one of the components of the NNT is to be modified;
modifying the at least one of the components of the NNT based on the user input;

determining whether the modification of the at least one of the components is against one or more source rules of a source network, wherein:
responsive to the modification of the at least one of the components not being against one or more of the source rules, automatically proceeding with the modification of the at least one of the components; or
responsive to the modification of the at least one of the components being against one or more of the source rules, providing a notice via the GUI that includes information related to the one or more source rules that the modification of the at least one of the components will be against; and
displaying, via the GUI, the NNT that comprises the modification of the at least one of the components.

15. The non-transitory computer-readable storage medium of claim 14, the operations further comprising:
obtaining a validation dataset;
generating validation machine learning results based on machine learning performed using the NNT that comprises the modification of the at least one of the components and the validation dataset;
generating comparison machine learning results based on machine learning performed using a pre-selected NNT and the validation dataset; and
validating the NNT comprising the NNT that comprises the modification of the at least one of the components by comparing the validation machine learning results with the comparison machine learning results.

16. The non-transitory computer-readable storage medium of claim 15, the operations further comprising:
determining an additional modification to at least one of the components based on the comparison of the validation machine learning results with the comparison machine learning results; and
providing a recommendation, via the GUI, relating to the modification of the at least one of the components.

17. The non-transitory computer-readable storage medium of claim 14, the operations further comprising receiving, via the GUI, an initial user input effective to select an area of the NNT including a subset of the multiple components, wherein at least a portion of the subset of the multiple components is to be modified based on the user input.

* * * * *